United States Patent [19]

Makosch

[11] 3,709,579

[45] Jan. 9, 1973

[54] OPTICAL SYSTEM FOR FOCUSING SPACED OBJECT PLANES IN A COMMON IMAGE PLANE

[75] Inventor: Gunter Makosch, 7034 Maichingen, Germany

[73] Assignee: International Business Machines Corporation, Armonk, N.Y.

[22] Filed: March 18, 1971

[21] Appl. No.: 125,570

[30] Foreign Application Priority Data

March 19, 1970 Germany.....................P 20 13 101.5

[52] U.S. Cl. ..........................350/30, 350/8, 350/33, 350/81, 356/168, 356/172

[51] Int. Cl..............................................G02b 21/18

[58] Field of Search ........350/30, 33, 81, 8; 356/168, 356/172

[56] References Cited

UNITED STATES PATENTS

| | | | |
|---|---|---|---|
| 3,544,191 | 12/1970 | Rottmann | 350/8 |
| 3,323,417 | 6/1967 | Grey et al. | 356/125 |

FOREIGN PATENTS OR APPLICATIONS

| | | | |
|---|---|---|---|
| 1,037,171 | 8/1958 | Germany | 350/30 |
| 198,006 | 1/1967 | U.S.S.R. | |

*Primary Examiner*—David Schonberg
*Assistant Examiner*—Toby H. Kusmer
*Attorney*—Hanifin and Jancin and Henry Powers

[57] ABSTRACT

An optical system for focusing spaced object planes into a common image plane by means of a compensating optical element alternately placed and removed from between an objective and the object planes which equalizes the optical paths thereof.

24 Claims, 26 Drawing Figures

INVENTOR
GÜNTER MAKOSCH

BY [signature]
ATTORNEY

SEPARATION OF THE TWO OBJECT PLANES
h = 25μ
FOCUSSED ONTO MASK SURFACE

SEPARATION OF THE TWO OBJECT PLANES
h = 80μ

SEPARATION OF THE TWO OBJECT PLANES
h = 25μ
FOCUSSED ONTO WAFER SURFACE

SEPARATION OF THE TWO OBJECT PLANES
h = 100μ

SEPARATION OF THE TWO OBJECT PLANES
h = 50μ

SEPARATION OF THE TWO OBJECT PLANES
h = 150μ

IMAGE OF MASK PLANE

IMAGE OF WAFER PLANE

CONTRAST RATIO 1:1

CONTRAST RATIO 2:1

IMAGE OF MASK PLANE

IMAGE OF WAFER PLANE

IMAGE OF BOTH PLANES COMPENSATED BY ROTATING PLATE

OPTICAL SYSTEM FOR FOCUSING SPACED OBJECT PLANES IN A COMMON IMAGE PLANE

BACKGROUND OF THE INVENTION

In photolithographic processes employed in the production of integrated circuits, sets of correlated masks are required for exposing films of photoresist coated on semiconductor wafers. The electrical properties of the final integrated circuits depend on the correct registration of the different masks which are necessary for the process steps. Therefore each mask must be correctly aligned with respect to the structures produced on the wafer in previous processing steps. Typical of such systems which may be employed for alignment can be found described in U.S. Pat. No. 3,461,566 and U.S. Pat. No. 3,475,097.

Conventionally, to effect relative adjustment of semiconductor device masks to semiconductor wafers or substrates, an alignment microscope is used which is part of a wafer contact printing apparatus. Large image magnifications and high image resolutions are required for high accuracy alignments. Therefore, high numerical aperture objectives have to be employed for the adjustment of the two elements. The depth of focus of such microscope objectives is very small, inherently requiring the mask and wafer to be only separated by a few microns. Otherwise, the two object planes of the mask and wafer cannot be viewed simultaneously with any reasonable image quality.

However, the wafer surfaces are not flat and, in addition epitaxial spikes (on epi-layers formed on the wafers) can be found with heights of the order of 10 microns or more on the wafer surface. These spikes will damage the semiconductor device mask by scratching the emulsion during the alignment process. This damage can be avoided by separating the mask and wafer for the alignment by a distance larger than the maximum height of the epitaxial spikes. Generally, this requires separations of the order of about 25 microns. Since such a distance between wafer and mask is larger than the depth of focus of the imaging lens of the microscope system, the two planes can be viewed simultaneously only with a very poor image quality. This low image quality very seriously affects the alignment accuracy of mask and wafer.

Heretofore, it has been proposed to improve the image quality by focusing the microscope alternatively on to the wafer and mask surface. Typical of such system is that described in the U.S. Doherty Pat. No. 3,488,104 and in an adaptable Russinow et al. Russian Pat. No. 198,006. In the Doherty system, the variation in focusing on the mask and wafer surface is effected by variations in the optical path of an image by use of optical elements disposed intermediate the objective and eyepiece of the microscope employed. Although such a system provides means for adjusting the optical path of images from spaced superposed mask and wafer arrangement, it nevertheless is characterized with the disadvantage of possible instability resulting from environmental vibrations. Another disadvantage of such a system is the involved complexity of the resultant microscope necessitating unique structures which preclude use of conventional microscopes.

In the Russinow et al Russian Patent, the system described therein employs a stepped compensating disc disposed between the microscope objective and eyepiece for altering the depth of focus of the system to enable focussed viewing of different spaced object planes. However, this Russian Russinow system is characterized by a periodic alteration in the magnification of the imaging system in conjunction with degradation in resolution. To avoid the periodic alteration of magnification, the Russian Russinow system employs telecentric ray in conjunction with a very complicating illuminating system. Such provision of a telecentric beam path through the rotatable glass plate of the Russinow system (between the objective and the image plane) causes the resolution to be degraded more than a system avoiding the use of telecentric rays. Also, a magnification of the optical system in the Russian Patent has limited constancy.

In addition, both the U.S. Doherty patent and the Russian Russinow et al. patent find little application in semiconductor technology employing mask and semiconductor wafers of low contrast ratios.

SUMMARY OF THE INVENTION

In accordance with this invention, a microscope system is provided for periodic focusing of superposed spaced object planes (into which a semiconductor device mask and a semiconductor wafer are positioned) into a common image plane by alternately interposing and withdrawing an optical compensator intermediate the objective of the microscope and the object planes for equalizing the optical paths of the images from the object planes. The rate of interpositioning and withdrawing of the optical compensator intermediate the objective means and the object planes is effected for respective time durations having a ratio inverse of the contrast ratio of the object planes, e.g., a semiconductor device mask and a semiconductor wafer or substrate. The invention also comprehends a further enhancement of the images projected from spaced object planes for particular application in the alignment of semiconductor device masks and semiconductor substrates or wafers, by use of an optical compensator which constitutes an optical green filter intermediate the objective of the microscope system and the object planes of the mask and semiconductor substrate.

DESCRIPTION OF THE PREFERRED EMBODIMENTS

When an optical compensator, such as a plane parallel glass plate, is placed in the optical path, the optical path changes the path length in such an arrangement by an amount $$h=d(1-1/n) \qquad (1)$$

$$\text{or} \quad d=hn/n-1 \qquad (2)$$

where $n$ is the index of refraction of the compensator or glass plate, $d$ is the thickness of the compensator or glass plate, and $h$ is the change in the optical path length. If the optical compensator or glass plate is inserted into the object space of the imaging lens, either the image or the object plane of the lens is moved away from the lens.

Figure 1A:
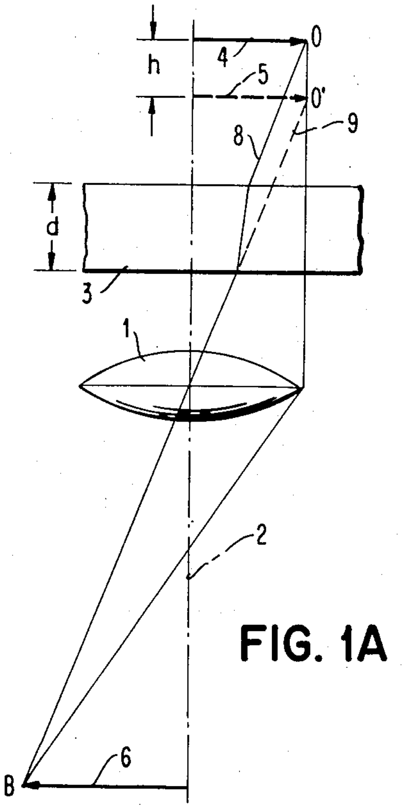
FIGS. 1A and 1B are schematic representations for illustrating the background for the operation of the invention.

For example, the arrangement shown in FIG. 1A illustrates the maintenance of a fixed object plane in conjunction with variation of the image planes. This system includes a lens 1 on an optical axis 2 in conjunction with an optical compensator such as a plane parallel glass plate 3 of thickness $d$. The object points 0 and 0′ are placed in the object planes 4 and 5, respectively, at a distance or spacing $h$ to each other. The object point 0, on projection through the optical compensator 3, is focused on the image point B on image plane 6. For purposes of simplicity, only a main beam 8 of the impinging bundle of rays is shown. On removal of the optical compensator 3 from the beam path, the object point 0′ on object plane 5 is focused on the image plane 6, with the bundle of rays simplified by use of a main beam 9. If it is assumed that the field depth range of lens 1 is smaller than the distance or spacing $h$ between the object planes 4 and 5, only one of the object points 0 or 0′ can be imaged in focus on image plane 7. When both object planes 4 and 5 are to be observed simultaneously, the optical compensator 3 is inserted and withdrawn from between lens 1 and object planes 4 and 5 at least sixteen times per second. In such a manner, an observer looking at the image plane 6 will simultaneously see flicker-free images of object planes 4 and 5.

Figure 1B:
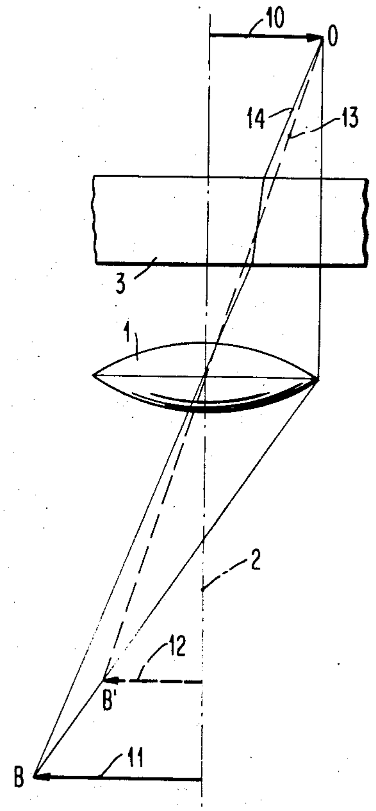

In the arrangement shown in FIG. 1B, the system comprehends the imaging of a single object 0 on the object plane 10. Depending on whether or not the optical compensator 3 is positioned in the beam path of lens 1, the object point O is shown as an image point B in image plane 11, or as an image point B′ on the image plane 12. As above, the imaging bundles of rays are represented by the main rays 13 or 14, respectively.

Figure 2A:
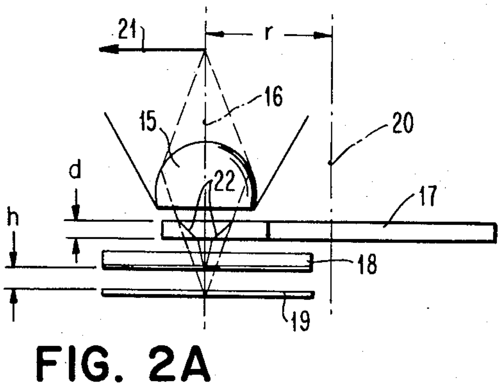
FIGS. 2A and 2B are schematic representations illustrating one embodiment of applicant's invention.
Figure 2B:
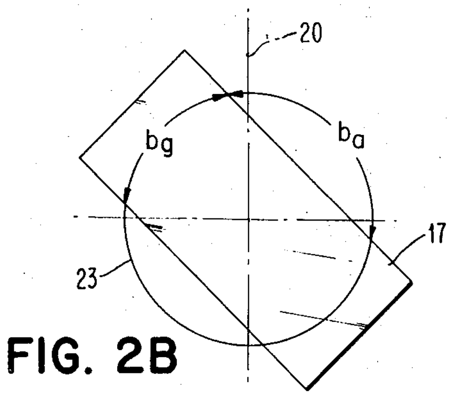

FIG. 2 illustrates one embodiment of the invention which includes a microscope objective 15 on a main optical axis 16, and optical compensator such as a glass plate 17, with a thickness $d$, a semiconductor device mask 18, and a semiconductor wafer or substrate 19 spaced at a distance $h$ from the mask and aligned with respect to the mask. The glass plate compensator 17 is shown in FIG. 2A in a sectional view, with the plan view thereof shown in FIG. 2B rotatably mounted about an axis of rotation 20. When the glass plate compensator 17 is positioned in the beam path of the microscope objective 15, an object point on semiconductor wafer 19 is focused on image plane 21 by beam 24. When the plate glass compensator 17 is moved out of the optical path of microscope objective 15, an object point on the lower surface of mask 18 is focused on image plane 21 by beam 22. Conjointly, when the glass plate compensator 17 remains intermediate microscope objective 15 and semiconductor device mask 18, an object point on semiconductor wafer or substrate 19 is focused on another image plane so that it is imaged (if the depth of field of the microscope objective 21 is smaller than H) out of focus on image plane 21. However, in the absence of glass plate compensator 17, an object point on the semiconductor mask 18 is focused on image plane 21. If the glass plate compensator 17 is rotated, the lower surface of the semiconductor device mask 18 is focussed on image plane 21 within the range of the arc $b_a$ forming part of an annulus 23 concentric with an axis of rotation 20. However, in the range of the arc $b_g$, of annulus 23, the semiconductor wafer or substrate 19 is focussed on image plane 21. If the glass plate compensator 17 is rotated with sufficient speed, i.e., with at least 8 revolutions per second, an observer looking at image plane 21 will simultaneously see flicker-free and focussed images of the lower surface of semiconductor mask 18 and of semiconductor wafer or substrate 19.

A comparison of the arcs marked $b_g$ and $b_a$ shows that upon constant rotational speed of glass plate compensator 17, the semiconductor wafer or substrate 19 is focussed on image plane 21 for a longer time than the lower surface of semiconductor mask or substrate 19. In this manner, differences of brightness or contrast can be compensated so that an observer looking at image plane 21 will see uniformly illuminated images of the lower surface of optical mask 18 and of the semiconductor wafer or substrate 19. It has been found that the focussed images on image plane 21 are characterized by an extremely low rate of disturbance by the unfocussed images of the same surface occurring simultaneously on this image plane, if the distance $h$ between the optical mask 18 and the semiconductor wafer or substrate 19 is considerably larger than the depth of field of the microscope objective 15 employed.

The system may be readily employed for focusing the microscope on to two object planes alternately. By introduction of the glass plate compensator of thickness $d$ into the optical path, the microscope is focussed on to the bottom surface of the semiconductor device mask. If the glass plate compensator is removed from the object space of the microscope, an image of the top surface of the spaced wafer is obtained. For an exact compensation of the distance $h$ between semiconductor mask 18 and semiconductor substrate 19, the glass plate compensator must be selected in accordance with Equation 1 above. A periodic focusing can be achieved by rotating the glass plate compensator 17 in the object space of the microscope. Generally as shown in FIGS. 2A and 2B, the plane of the parallel glass plate compensator 17 is mounted on an axis of rotation 20 parallel to the optical axis 16 of the microscope. The distance between the optical axis 16 and the axis of rotation 20 is $r$, with $d$ representing the thickness of the plate and where $h$ is the distance or spacing between the semiconductor device mask 18 and the semiconductor wafer 19. Any suitable motor may be conventionally mounted to drive the optical compensator 17 at desired speeds. At an operating speed of rotation, providing more than 16 image changes per second, both images (of the semiconductor device mask 18 and semiconductor wafer 19) will be visible simultaneously.

The optical system of this invention has particular application to present mask alignment schemes which are very difficult for use where high density masks have to be adjusted relative to semiconductor wafers. In such a case, the image of the semiconductor wafer surface is mainly obstructed by the large opaque areas of the overlying mask. By use of the optical system of this invention, the visibility of the wafer surface through the opaque areas of the mask can be readily obtained. This can be readily seen when it is understood that where the separation of the two object planes is large compared to the depth of focus of a microscope lens, the focusing of the microscope on to one object plane generates an image which is almost entirely free of interferences from the image corresponding to the other object plane. Thus the two images are ultimately visible over the full field. Since a human observer sees the two images simultaneously overlaid, to him the wafer surface appears completely visible through the mask pattern.

However, the contrast of the two objects (e.g., wafer and mask) are quite different. Whereas the pattern on the wafer surface is of low contrast, the mask with an optical density of at least 2.0 is of very high contrast. If the two images are displayed with the contrast ratio of the objects, the visibility of the wafer pattern in the opaque areas of the mask is relatively poor.

The optical compensation system of this invention allows the adjustment of the contrast of the two images to be made to any desired value. This can be achieved by varying the duty cycle of the two images. Thus in the embodiment of FIGS. 2A and 2B, the contrast ratio R of the two images will conform to the equation $$R = P_o / P_r = b_g / b_a \qquad (3)$$

where $P_o$ and $P_r$ representing the respective contrasts of the semiconductor mask and the wafer, and $P_o$ and $P_r$ corresponding to the respective arc lengths $b_g$ and $b_a$ of the glass and air sectors of the compensator 17.

Figure 3A:
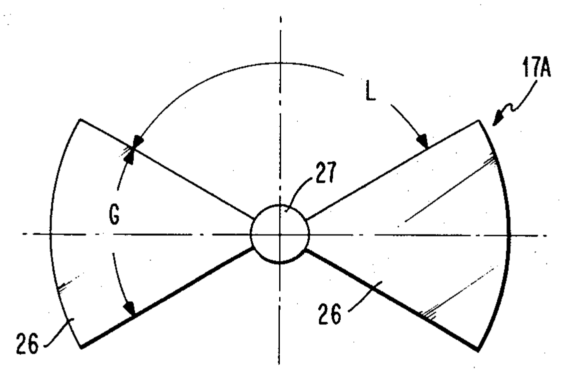
FIGS. 3A and 3B are schematic illustrations of other embodiments of applicant's invention.
Figure 3B:
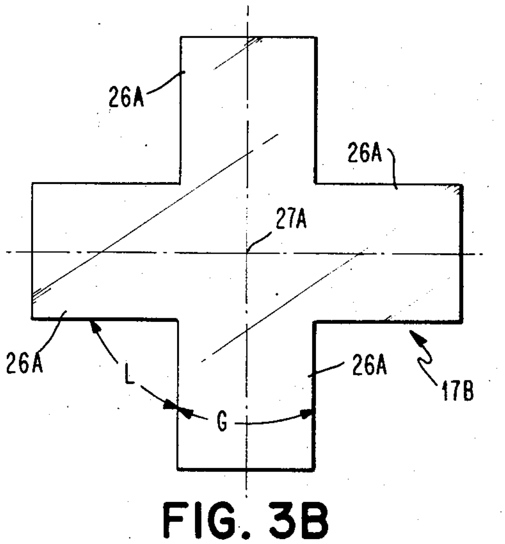

Additional embodiments of the compensator employed in this invention, are shown in FIGS. 3A and 3B. In FIG. 3A an optical compensator is shown with a ratio R independent of the distance $r$ between the optical axis of the microscope and the axis of rotation of the compensator.

However, with the specific embodiment shown in FIG. 3B, the duty cycle R depends on the distance $r$. Such a compensator permits a change of the contrast ratio of the two images by simply moving the axis of rotation of the compensator relative to the optical axis of the microscope.

In the embodiment shown in FIG. 3A, the compensator comprises a plane parallel glass plate 25 which is segmented into radial extension 26 so as to provide, upon rotation, imaging times for the beam path through the compensator which are of shorter time duration than the imaging times during which the compensator segments 26 are not interposed in the optical path of the microscope, as for example when the air space arc L traverses through the optical path of the microscope. As will be obvious, a shifting of the rotational axis 27 of the compensator with respect to the optical axis of the image system, does not change the ratio of the two imaging times indicated above. This is contrasted with the embodiment shown in FIG. 3B where the ratio between imaging times with the compensator in the beam path and the imaging times of the air space arc L is changed by shifting the rotational axis 27A relative to the optical axis of the microscope. The imaging times of the compensators 17, 17A, 17B (respectively in FIGS. 2A through 3B) by the arc lengths marked G and L. As will be understood, in the embodiment shown in FIGS. 2B and 3B, the ratio of the lengths of arcs G and L may be readily changed by shifting the rotational axis of the compensator with respect to the imaging beam path. In such a manner, it is possible to adapt the imaging times of the two planes to their brightness by a considerable extent without changing the arrangements for periodic focusing.

The optical compensator may be adapted to measure a plurality of object planes in excess of two. As for example, the radial segments of compensators 17, 17A, and 17B can be fabricated of different thicknesses, or made of transparent material having different indexes of refraction which will permit a periodic focusing on to more than two object planes. Thus with the arrangement shown in FIG. 3A, the radial segments can be modified to permit the optical system to alternately focus on to three different object planes. Similarly the embodiment of FIG. 3B can be adapted for focusing on five different object planes.

In general, the ratio of the imaging times with the compensator segments in the imaging path, and of the imaging times without compensation in the imaging paths can be called a scanning ratio which can be defined by the equation $$V_p = G/L \qquad (4)$$

where $G$ is the arc of the compensator sector and $L$ is the arc of the air sector. It is to be understood that in the embodiments of FIGS. 2B and 3B, the ratio will also be a function of the distance $r$ between the optical axis of the imaging system and the rotational axis of the compensator. In a particular embodiment, a Zeiss objective 20/0.35 ∞/1.5 was employed which enabled readily focusing of two object planes spaced 0.27mm apart while using a compensator having an index of refraction of 1.52 and a thickness of 0.8mm.

Figure 3C:
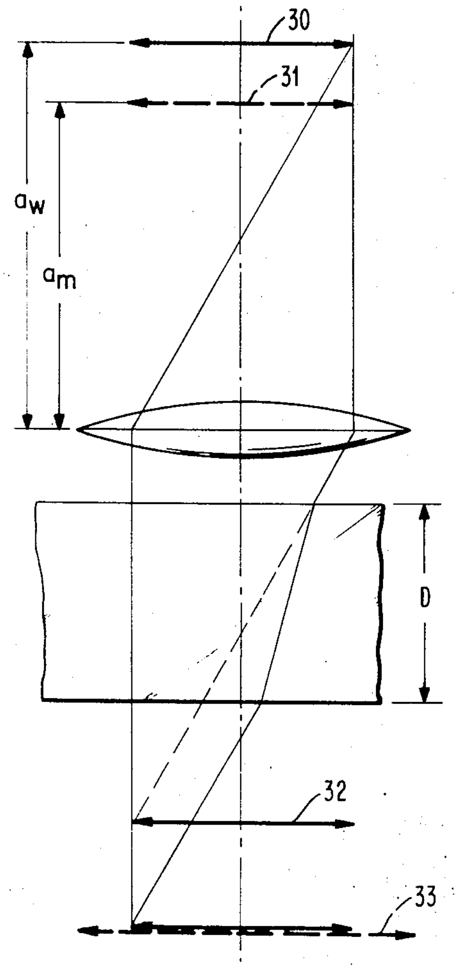
FIGS. 3C and 3D are schematic representations illustrating the operation of applicant's invention.

Although the optical path length compensation for the separation of the object planes can be employed in both the object and image space of a microscope, utilization of such compensation in the image space of the microscope is attended with inherent disadvantages which can be demonstrated by reference to FIG. 3C.

Figure 3D:
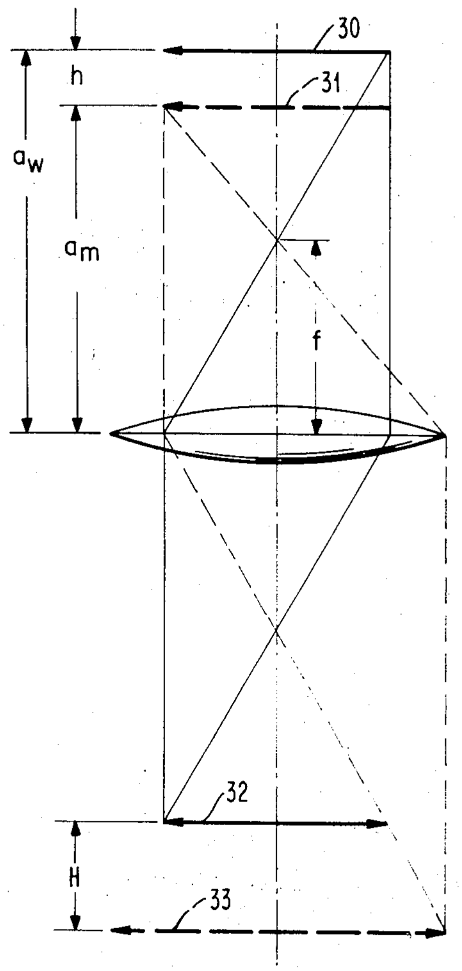

Normally, for good image space compensation, relatively thick optical compensating plates are required for compensation in the image are required, and the two images will be displayed with different magnification ratios. The latter disadvantage disqualifies the image space compensation for high density semiconductor fabrication. In FIGS. 3C and 3D ray tracing for the two images without compensation and with compensation of the wafer image is shown.

With reference to FIGS. 3C and 3D, if the separation of the two object planes 30 and 31 is $h$ the corresponding separation H of the two image planes 32 and 33 depends on the magnification ratio M in accordance with the following equation $$H/h=M^2 \qquad (5)$$

Also the thickness of the glass plate compensator 17 is proportioned to the separation to be compensated. In accordance with the equation $$H/h=D/d \qquad (6)$$

where $D$ is the thickness of the compensator plate required in the image space and $d$ designates the thickness of a compensator element which would be required in the object space of the microscope. Accordingly from Equations 5 and 6, it follows that compensation in the image spaces of the microscope requires a much thicker optical element than would be required for compensation of the object space.

The difference in magnification of the two images is shown in FIG. 3D. Using the lens equation for thin lenses, the two magnification ratios can be calculated in accordance with the following equation $$V_m=(f)/(a_m-f) \qquad (7)$$

$$V_w=(f)/(a_w-f) \qquad (8)$$

In the foregoing equations $V_m$ and $V_w$ are the magnifications of mask and wafer image, $a_m$ and $a_w$ are corresponding object distances, and $f$ is the focal length of the imaging lens. The difference in magnification can be given by the following equation $$\Delta V=V_m-V_w=(V_w^2\,h)/(f-V_w h)$$

which reduces to $$(\Delta V)/(V_w)=(V_w h)/(f-V_w h)$$

For a 20X microscope objective ($f$ = 8.3mm) and a wafer/mask separation of $h$ = 25 microns (50 microns), the relative change in magnifications $(\Delta V)/(V_w)$ = 6% (12 percent), FIG. 3C shows that this difference in magnification is continued to be maintained after application of image space compensation.

Figure 4:
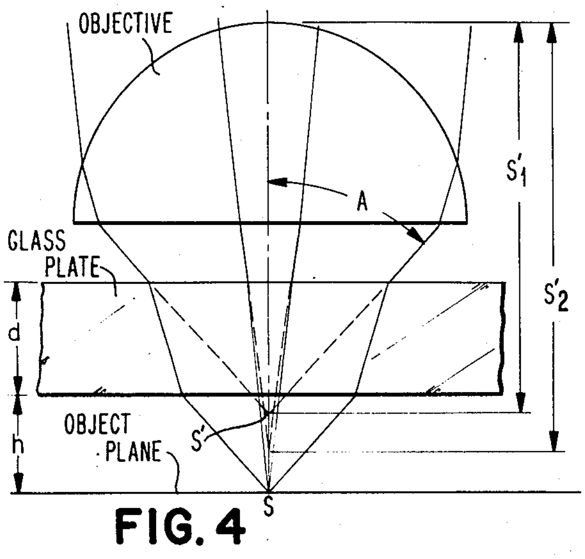
FIG. 4 is a schematic illustration of spherical aberrations which may be encountered in the practice of applicant's invention.

Also comprehended with this invention are compensation for various optical errors that may be encountered. For example a plane parallel glass plate when placed into the optical path of an optical system introduces spherical aberrations. If the plate is oblique to the axis of the optical system, astigmatism and coma are generated as well. Also an inclination of the plate can introduce beam displacement which leads to alignment errors. The following errors and their influence on wafer/mask alignment are analized below:

1. Spherical aberrations of a plane parallel plate
2. Displacement due to an inclination of the plate
3. Displacement due to a wedge-type plate The effect of spherical aberrations of a plane parallel plate is illustrated in FIG. 4 wherein all rays are shown diverging from a point S, in an object plane, as refracted and displaced parallel to themselves by the glass plate.

When entering the objective lens of the microscope, the rays appear to diverge from a virtually object point S' in which the extensions of the displaced rays intersect. However, as can be seen in FIG. 4, the location of the vertical object points $S_1'$ and $S_2'$ depends on the angle of divergence A. Due to this induced vertical aberration, the objective lens generates a blurred image of the point S.

The amount of spherical aberration is given as the distance between the virtual object points $S_1'$ of the peripheral rays and of the paraxial rays $S_2'$ in accordance with the following equation $$S=S_2'-S_1'=d\,((n^2-1)/(2n^3))\,A^2 \qquad (9)$$

where $S_1'$ and $S_2'$ are measured from the front lens of the microscope objective, $d$ is the thickness and $n$ is the refractive index of the compensator. Also sin $A$ in the above equation is a numerical aperture of the microscope objective. Thus the spherical aberration introduced by a plane parallel plate depends on the thickness of the plate and on the numerical aperture of the microscope objective.

As will be understood microscope objectives for use with cover-glasses for specimens are normally corrected for a corresponding spherical aberrations. Generally the thickness of such cover-glasses is $d$ ≈0.17mm. Normal microscope objectives are corrected for such cover-glass thicknesses. Similarly for use in applicant's inventions, microscope objectives to be employed in wafer/mask alignment microscopes should be corrected for mask thicknesses of 1.6mm (0.60'').

In general the tolerance of the cover-glass thickness depends on the numerical aperture of the microscope objective. Normally it decreases with increasing numerical aperture. For example, for an E. Leitz microscope objective 32X/0.62 which is corrected for cover-glass thicknesses of 1.8mm, the tolerance in thickness is ±10 percent. This means, that for such a lens a glass plate of up to 0.4mm can be employed for compensation of the object plane separation without seriously degrading the image quality. In such a microscope system, object separations of up to 0.13mm can be compensated. The range of permitted object plane separation is even larger in microscopes with smaller numerical apertures.

Figure 5:
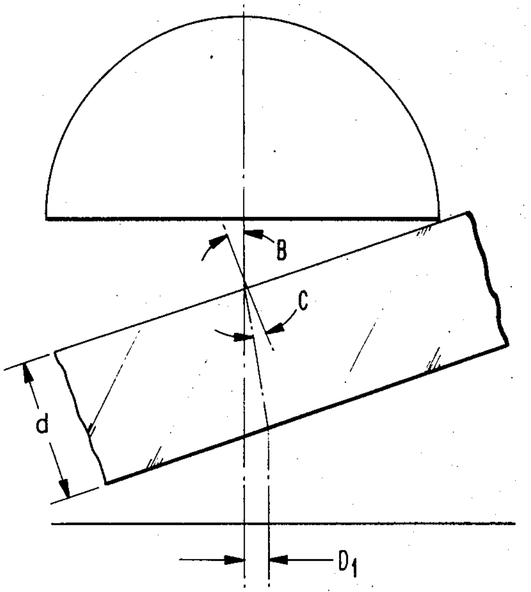
FIGS. 5 and 6 are schematic representations illustrating image displacements which may be encountered in the practice of applicant's invention.

The errors due to inclination of the glass compensator placed in the optical path at an angle is shown in FIG. 5. As shown in the drawing the rays emerging from the glass plate will travel in the direction parallel to the incident rays. The beam displacement is given by the equation $$D_1=d\,(\sin(A-B))/(\cos B) \qquad (10)$$

where $d$ is the thickness of the glass plate compensator, and $A$ and $B$ are the angles of incidence and refraction at the glass plate.

For small angles $A$ and $B$, the above equation reduces to $$D_1=d\,(1-(1)/n)) \qquad (11)$$

which with Equation 1 above can be further reduced to $$D_1 = hA \quad (12)$$

The displacement due to the inclination of the glass plate is therefore directly proportional to the distance $h$ which has to be compensated. The displacement $D_1$ will be the amount of alignment error.

Figure 6:
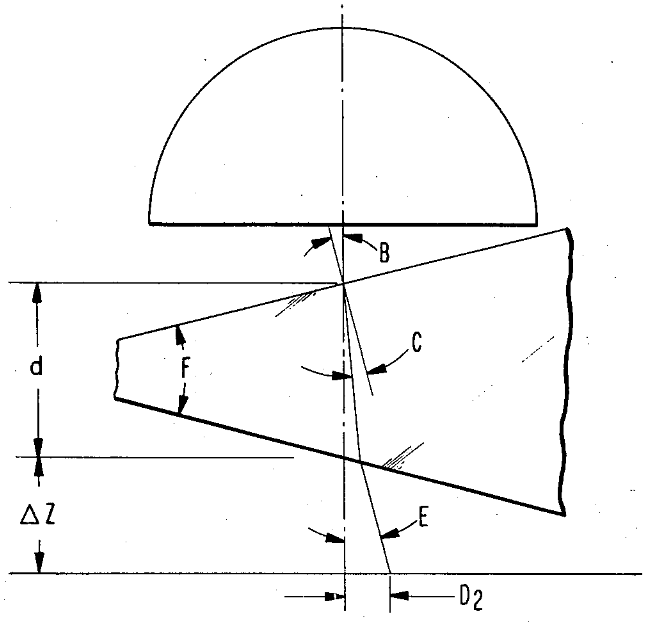

Another possible alignment error occurs when the two surfaces of the glass plate are not parallel to another. In this case, the glass plate will act as a prism and the light rays are deviated from their paths. FIG. 6 shows the path of a ray going through a wedge-type plate. The amount of displacement obtained in the object plane is given by the equation $$D_2 = d \tan (B-C) + \Delta Z \tan (E) \quad (13)$$

where $d$ is the thickness of the plate, $B$ and $C$ are the angles of incidence and refraction, $\Delta Z$ is the distance between the plate and wafer, and $E$ is the angle of deviation of the ray.

Assuming a minimum of deviation (e.g., the light passes through the prism symetrically) the relation between the wedge angle $F$ and the angle of deviation can be written as $$E = (n-1)\, F \quad (14)$$

Here $E$ and $F$ are for all practical purposes extremely small angles, and $n$ is the refractive index of the glass plate compensator. With this relation and the equation $$B = \tfrac{1}{2} F \quad (15)$$

$$C = \tfrac{1}{2} F/n \quad (16)$$

Equation 13 can be reduced to $$D_2 = [\tfrac{1}{2} d(1-(1/n) + (n-1)\Delta Z]F \quad (17)$$

which can be further reduced by Equation 1 above to $$D_2 = [\tfrac{1}{2} h + (n-1)\, \Delta Z]F$$

The distance $\Delta Z$ is determined by the glass plate-mask distance, the effective thickness of the mask, and the separation $h$. This means that $\Delta Z$ is greater than $h$. Therefore, in order to keep the displacement $D_2$ as small as possible, $\Delta Z$ has to be made as small as possible. This latter can be achieved by minimizing the glass plate/mask separation.

As shown, both, the inclination of the glass plate and the wedge angle of the plate will cause a displacement of the image and therefore an alignment error as follows $$D = D_1 + D_2 \quad (18)$$

For a mask-wafer alignment accuracy of ±0.5 micron (20 micron inch), the alignment error due to systematic errors has to be negligible, e.g., $$D < 0.5 \text{ microns.} \quad (19)$$

Assuming that two errors $D_1$ and $D_2$ to be equal, their relationship can be established as $$E_1 = D_2 = \tfrac{1}{2} D \quad (20)$$

The tolerable angles of inclination and wedge angles of the glass plate are given in the table below for a typical mask thickness of ≈ 1.6mm, a plate-mask separation of ≈ 0.2mm and an alignment error.

$$D_2 = D_1 = 0.05 \text{ microns}$$

This table has been calculated using Equations 12 and 17 above.

| h, (micron) | d (mm) | B, (max) | F (max) |
|---|---|---|---|
| 10 | 0.03 | 17.2′ | 16″ |
| 20 | 0.06 | 8.6′ | 16″ |
| 30 | 0.09 | 5.1′ | 15″ |
| 40 | 0.12 | 4.3′ | 15″ |
| 50 | 0.14 | 3.4′ | 15″ |
| 60 | 0.17 | 2.9′ | 15″ |
| 70 | 0.20 | 2.5′ | 14″ |
| 80 | 0.23 | 2.1′ | 14″ |
| 90 | 0.26 | 1.9′ | 14″ |
| 100 | 0.29 | 1.7′ | 14″ |
| 150 | 0.43 | 1.1′ | 13″ |
| 200 | 0.58 | 0.8′ | 12″ |
| 260 | 0.75 | 0.6′ | 11″ |

Figure 7A:
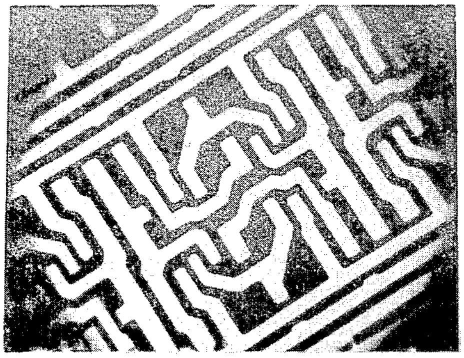
FIGS. 7A to 8C are lithographic reproductions illustrating the image quality obtained in the practice of applicant's invention with superposed spaced semiconductor device masks and semiconductor wafers or substrates.
Figure 8A:
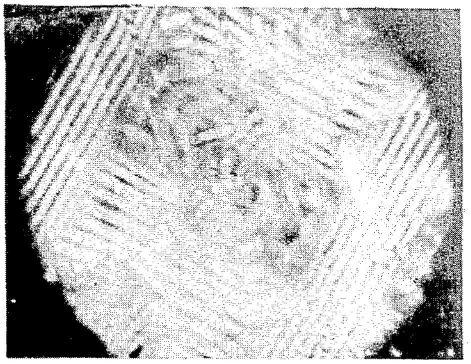
Figure 7B:
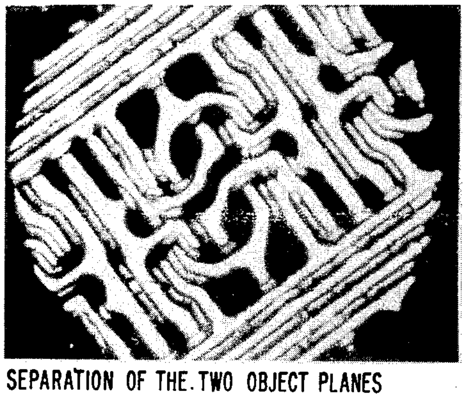
Figure 8B:
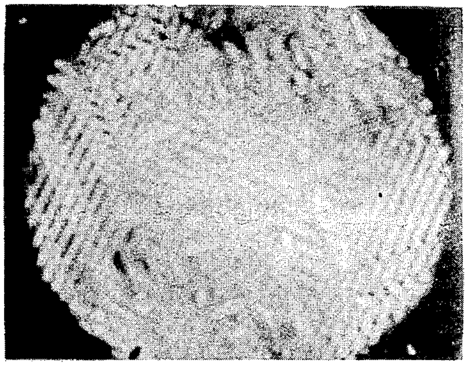
Figure 7C:
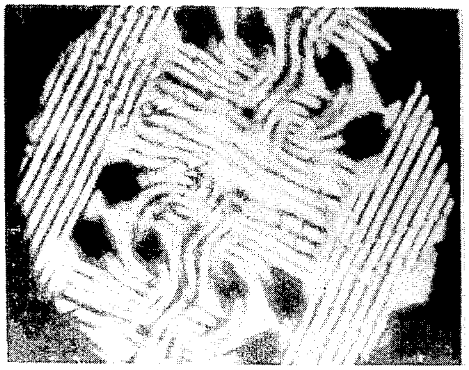
Figure 8C:
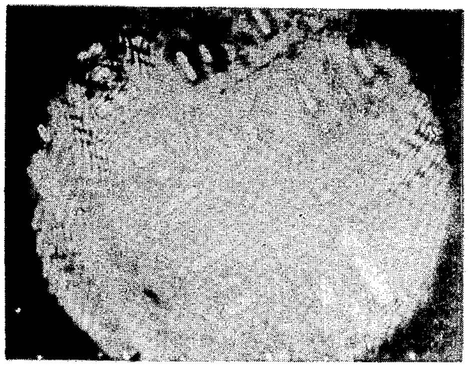

$h$ = distance between wafer surface and mask
$d$ = thickness of glass sector
$A_{max}$ = permissible inclination of glass sector plate
F = permissible wedge angle of glass sector plate As will be appreciated, the optical quality of the individual image (mask or wafer) will depend on the separation $h$ between the two object planes and on the depth of focus of the microscope objective. The image degradation of one image by the presence of a second image is shown in the drawings. Thus FIG. 7A shows the image of two objects (a semiconductor wafer and a semiconductor device mask) separated by a distance of 25 microns. The microscope objective, 20X/0.35, employed was focused on to the mask. Due to the low contrast of the wafer image, this pattern cannot be identified. In FIGS. 7B to 8C, the same microscope objective was focussed onto the wafer surface and the distance $h$ between wafer and mask was constantly increased. It is noted that for technical reasons, the objective was not used with its full numerical aperture, but rather with an aperture of 0.15. As can be seen in the drawings, the visibility of the wafer image was constantly improved by increasing the mask-wafer separation. It may be noted that the separation of the mask and wafer may be decreased for a microscope objective with a larger numerical aperture and a corresponding smaller depth of focus.

Figure 9A:
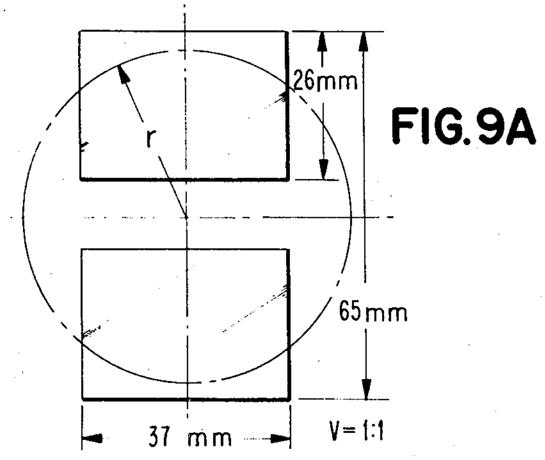
FIGS. 9A and 9B are schematic representations illustrating other embodiments of applicant's invention.
Figure 9B:
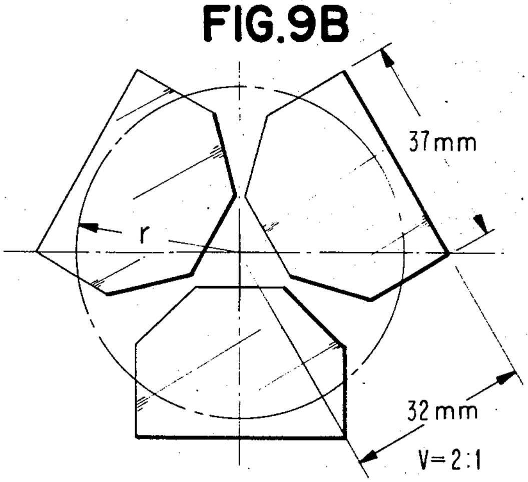
Figure 10A:
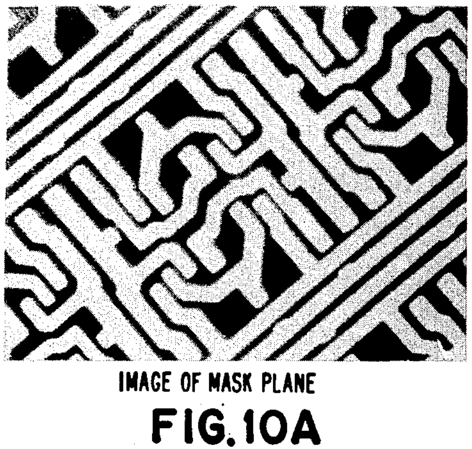
FIGS. 10A and 10B are lithographic reproductions illustrating the image quality obtained of individual mask and wafer features in practicing applicant's invention.
Figure 10B:
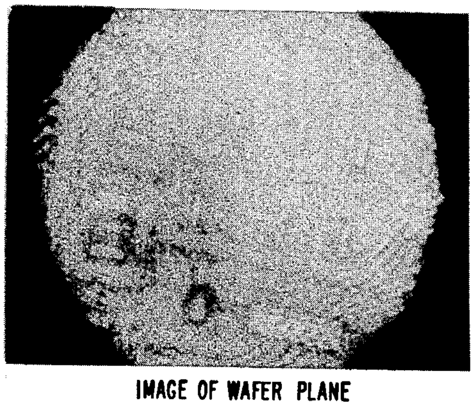

The invention was also tested on a mask-wafer arrangement having an air gap spacing of $h$ = 250 microns. This large air gap was chosen since a glass plate compensator of 0.75 mm thickness was readily available. Two different kinds of sector discs with contrast ratios of 1:1 and 2:1 were tested. The sector arrangements are shown in FIGS. 9A and 9B. The sector arrangement of FIG. 9A gave a contrast ratio Of 1:1, whereas a contrast ratio of 2:1 is obtained with the arrangement shown in FIG. 9B. The images of the two object planes (mask and wafer) separated by 250 microns, and viewed separately, are shown in FIGS. 10A and 10B. The same two images viewed simultaneously by compensation with a rotating sectorized compensating disc are shown in FIGS. 11A and 11B.

Figure 11A:
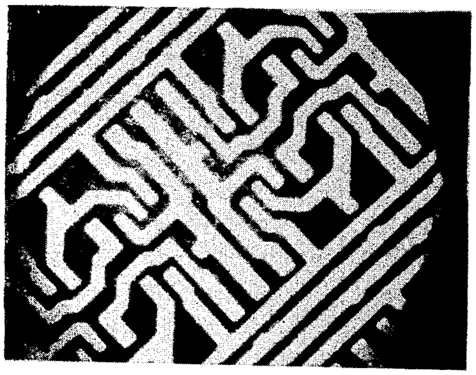
FIGS. 11A and 11B are lithographic reproductions illustrating the simultaneous viewing of a semiconductor device mask and a semiconductor wafer utilizing two different contrast ratios in the practice of applicant's invention.
Figure 11B:
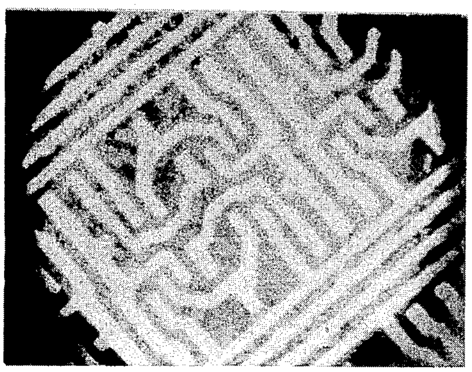
Figure 12A:
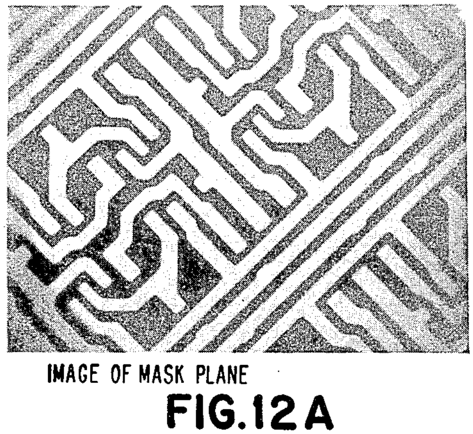
FIGS. 12A to 12C are lithographic reproductions illustrating image improvement by use of an optical compensator concept which also constitutes an optical green filter.
Figure 12B:
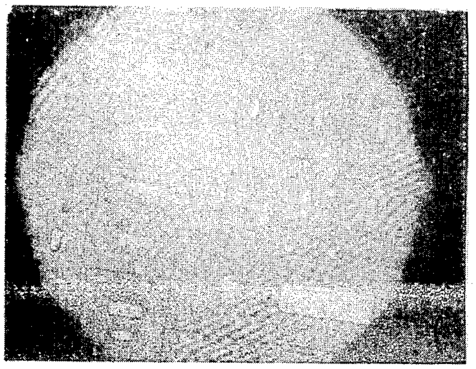
Figure 12C:
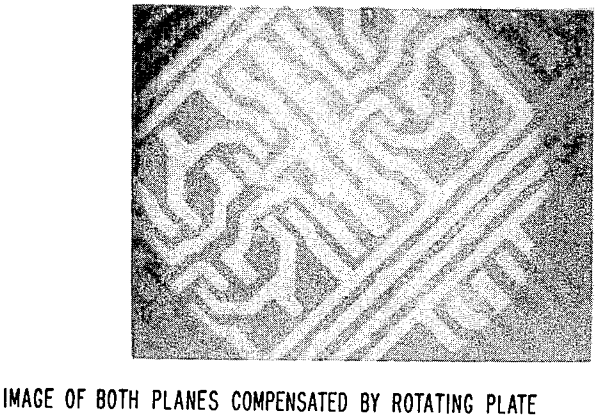

A contrast ratio $R$ = 1:1 obtained with a compensating disc such as shown in FIGS. 9A can be seen in FIG. 11A. Conversely FIG. 11B shows a contrast ratio $R$ = 2:1 obtained with a corresponding sectionalized compensating disc of FIG. 9B. Best results were obtained by using a duty cycle of 2:1. Here the contrast to the wafer approximates that of the mask image. FIGS. 12A to 12C show another aspect of this invention for obtaining improvements in contrast by introducing a simple green-glass optical filter into the optical path of the microscope. The contrast improvement is due to the wave length dependency of reflectivity of a thin silicon dioxide layer on a silicon semiconductor wafer. This strong wave length dependence is caused by thin film interference. The contrast to the wafer image can also be further improved by using anti-reflecting coatings on the compensating element, for minimization of background light.

While this invention has been particularly described with reference to the preferred embodiments thereof, it will be understood by those skilled in the art that the foregoing and other changes in form and detail may be made therein without departing from the spirit and scope of the invention.

What is claimed is:

1. A microscope system for periodic focusing of superposed spaced object planes into a common image plane comprising:

A. objective means for projecting images of said object planes;

B. compensating means for equalizing the optical paths of said object planes; and C. means for a sequentially interposing and withdrawing said compensating means into and from a position intermediate said objective means and said object planes wherein said compensating means comprises;

D. a sectionalized transparent planar means having peripheral portions rotatable intermediate said objective means and said object planes and having a. a first section in said peripheral portion for focusing a first of said object planes in said image plane, and b. a second section in said peripheral portion for focusing a second of said object planes in said image planes; and E. means to rotate said planar means at a constant speed for sequentially positioning said first and second sections between said objective means and said object planes for respective time durations having a ratio substantially equal to the contrast ratio of said object planes.

2. The system of claim 1 wherein

A. one of said object planes adjacent said objective means comprises a semiconductor device mask, B. a second of said object planes comprises a semiconductor substrate.

3. The system of claim 1 wherein said compensating planar means comprises a green optical filter.

4. The system of claim 3 wherein

A. one of said object planes adjacent said objective means comprises a semiconductor device mask, B. a second of said object planes comprises a semiconductor substrate.

5. A microscope system for periodic focusing of superposed spaced object planes into a common image plane comprising:

A. objective means for projecting images of said object planes;

B. compensating means for equalizing the optical paths of said object planes; and C. means for sequentially interposing and withdrawing said compensating means into and from a position intermediate said objective means and said object planes; wherein said compensating means comprises;

D. a segmented transparent optical plate having radially projecting segments rotatable on an arc intermediate said objective means and said object planes with said arc defined on an annulus concentric with the axis of rotation, with the arc of said segments on said annulus and the arc on said annulus between adjacent said segments having a ratio of said object planes; and E. means to rotate said plate about said axis of rotation.

6. The system of claim 5 wherein

A. one of said object planes adjacent said objective means comprises a semiconductor device mask, B. a second of said object planes comprises a semiconductor substrate.

7. The system of claim 5 wherein said segments comprise a green optical filter.

8. The system of claim 7 wherein

A. one of said object planes adjacent said objective means comprises a semiconductor device mask, B. a second of said object planes comprises a semiconductor substrate.

9. In an alignment apparatus for aligning a semiconductor device mask superposed over a semiconductor substrate in spaced relation therewith, a microscope means comprising:

A. an objective means adjacent said mask for projecting images of said mask and substrate;

B. compensating means for equalizing the optical paths of said mask and said substrate; and C. means for sequentially interposing and withdrawing said compensating means into and from a position intermediate said objective means and said mask in respective time durations having a ratio inverse to the contrast ratio of said mask to said substrate.

10. The apparatus of claim 9 wherein said compensating means comprises a green optical filter.

11. The apparatus of claim 9 wherein said compensating means comprises

A. a sectionalized transparent planar means having peripheral portions rotatable intermediate said objective means and said mask, and having a. a first section in said peripheral portion for focusing said substrate in an image plane, and b. a second section in said peripheral portion for focusing said mask in said image plane; and B. means to rotate said planar means at a constant speed for sequentially positioning said first and second sections between said objective means and said mask for respective time durations having a ratio inverse to the contrast ratio of said substrate and said mask.

12. The system of claim 11 wherein said planar means comprises a green optical filter.

13. The microscope of claim 9 wherein said compensating means comprises a segmented transparent plate having radially projecting segments rotatable on an arc intermediate said objective means and said mask with said arc defined on an annulus concentric with an axis of rotation, with the arc of a said segment on said annulus and the arc on said annulus between adjacent said segments having a ratio inverse to the contrast ratio of said object planes.

14. The system of claim 13 wherein said segments comprise a green optical filter.

15. A microscope system for periodic focusing on superposed spaced object planes in the optical axis of said system and having a contrast ratio R in accordance with the equation $$R = Po/Pr$$ where $Po$ is a said object plane adjacent the objective of said system and $Pr$ is a said object plane remote of said objective, comprising:

A. a transparent compensating plate having
 a. a selected refractive index $n$,
 b. a thickness $d$ corresponding to the equation $$d = hn/n-1$$ where $h$ is the spacing between said object planes, and
 c. focusing on said object plane $Pr$, and
B. means for sequentially interposing and withdrawing said plate intermediate said objective and said object plane $Po$
 a. for respective time durations of $Tp$ and $Ta$, with
 b. the ratio of $Tp/Ta$ equal to said $R$.

16. The system of claim 15 wherein
 a. said object plane $Pr$ comprises a semiconductor optical mask, and
 b. said object plane $Po$ comprises a semiconductor substrate.

17. The system of claim 15 wherein said compensating plate comprises a green optical filter.

18. The system of claim 17 wherein
 a. said object plane $Pr$ comprises a semiconductor optical mask, and
 b. said object plane $Po$ comprises a semiconductor substrate.

19. In an alignment apparatus for aligning a semiconductor mask superposed on a semiconductor substrate in spaced relationship therewith, a microscope means for periodic focusing on said substrate and said mask disposed in the optical axis of said microscope means and having a contrast ratio $R$ in accordance with the equation $$R = P_m/P_w$$

where $P_w$ is the contrast of said mask disposed adjacent the objective of said microscope system and $P_m$ is the contrast of said substrate remote of said objective, comprising:

A. a transparent compensating plate having
 a. a selected refractive index $n$,
 b. a thickness $d$ corresponding to the equation $$d = hn/n-1$$

where $h$ is a spacing between said mask and said substrate, and
 c. focusing on said substrate; and
B. means for sequentially interposing and withdrawing said plate intermediate said objective and said mask
 a. for respective time durations of $P_w$ and $P_m$, with
 b. the ratio of $P_w/P_m$ being equal to said contrast ratio $R$.

20. The apparatus of claim 19 wherein said compensating plate comprises a green optical filter.

21. The apparatus of claim 19 wherein said compensating means comprises
A. a sectionalized transparent planar means having a peripheral portion rotatable intermediate said objective and said mask, and having
 a. a first section in said peripheral portion for focusing said substrate in an image plane,
 b. a second section in said peripheral portion for focusing said mask in said image plane; and
B. means to rotate said planar means at a constant speed for sequentially positioning said first and second sections between said objective and said mask for respective time durations having a ratio inverse to the contrast ratio of said mask and said substrate.

22. The apparatus of claim 21 wherein said planar means comprises a green optical filter.

23. The apparatus of claim 19 wherein said compensating means comprises a segmented transparent plate having radially projecting segments rotatable on an arc intermediate said objective means and said mask with said arc defined on an annulus concentric with an axis of rotation, with the arc of a said segment on said annulus and the arc on said annulus between an adjacent pair of said segments having a ratio inverse to the contrast ratio of said mask and substrate.

24. The apparatus of claim 23 wherein said plate comprises a green optical filter.

* * * * *